(12) United States Patent
Matsui

(10) Patent No.: US 6,868,457 B2
(45) Date of Patent: Mar. 15, 2005

(54) DIRECT MEMORY ACCESS CONTROLLER, DIRECT MEMORY ACCESS DEVICE, AND REQUEST DEVICE

(75) Inventor: Satoshi Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/354,120

(22) Filed: Jan. 30, 2003

(65) Prior Publication Data

US 2003/0182478 A1 Sep. 25, 2003

(30) Foreign Application Priority Data

Mar. 19, 2002 (JP) ........................................ 2002-077221

(51) Int. Cl.$^7$ ............................................. G06F 13/28
(52) U.S. Cl. .......................................... 710/22; 710/25
(58) Field of Search ........................... 710/22, 75, 100, 710/107, 112, 113, 305, 308; 370/421, 439

(56) References Cited

U.S. PATENT DOCUMENTS

| | | | | |
|---|---|---|---|---|
| 4,901,234 A | * | 2/1990 | Heath et al. ................... | 710/40 |
| 5,497,501 A | * | 3/1996 | Kohzono et al. .............. | 710/29 |
| 5,918,070 A | * | 6/1999 | Moon et al. ................... | 710/22 |
| 6,006,287 A | * | 12/1999 | Wakazu ........................ | 710/22 |
| 6,154,793 A | * | 11/2000 | MacKenna et al. ........... | 710/23 |

* cited by examiner

Primary Examiner—Kim Huynh
Assistant Examiner—David Martinez
(74) Attorney, Agent, or Firm—Staas & Halsey LLP

(57) ABSTRACT

A direct memory access controller includes: one request signal input terminal for inputting a request signal while at least one of a plurality of request devices is outputting the request signal; one acknowledge signal output terminal for outputting an acknowledge signal to the plurality of request devices; and a control circuit. The control circuit outputs the acknowledge signal from the acknowledge signal output terminal and thereafter controls a data transfer based on the request signal from one of the plurality of request devices in response to a timing when the request signal inputted from the request signal input terminal changes in level.

17 Claims, 7 Drawing Sheets

F I G. 1
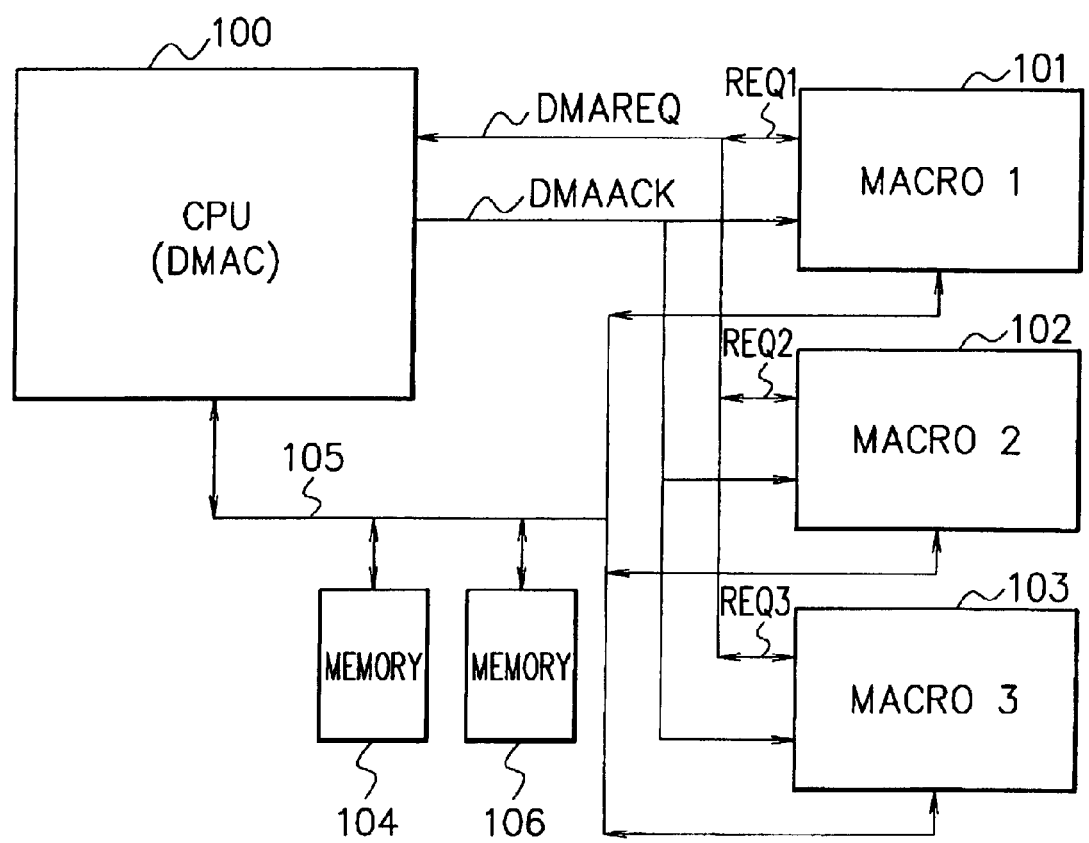

DIRECT MEMORY ACCESS CONTROLLER, DIRECT MEMORY ACCESS DEVICE, AND REQUEST DEVICE

CROSS-REFERENCE TO RELATED APPLICATIONS

This application is based upon and claims the benefit of priority from the prior Japanese Patent Application No. 2002-077221, filed on Mar. 19, 2002, the entire contents of which are incorporated herein by reference.

BACKGROUND OF THE INVENTION

1. Field of the Invention

The present invention relates to a direct memory access technology and, more specifically, to a direct memory access technology when a plurality of requests compete with each other.

2. Description of the Related Art

Recently, microcomputers have remarkably increased in speed and function. Along with this, cost reduction has also been an important issue to attain low prices. For lower costs, it is necessary to reduce chips in size and packages in the number of terminals. Also in consideration of the response of a direct memory access (DMA), reducing the number of terminals, even if it is only one, is a challenge which leads directly to a reduction in cost.

FIG. 7 shows a configuration of a DMA device according to the prior art. A microcomputer 700 contains a CPU and a DMA controller (DMAC) to input and output a request signal REQ and an acknowledge signal ACK from and to a plurality of macros 701 to 703 respectively. Each of the macros 701 to 703 has an output terminal for the request signal REQ and an input terminal for the acknowledge signal ACK. The microcomputer 700 has input terminals for the request signals REQ and output terminals for the acknowledge signals ACK corresponding to the number of the macros 701 to 703.

Each of the macros 701 to 703 can make a DMA request to the microcomputer 700 by the request signal REQ. Upon reception of the request signal REQ, the microcomputer 700 determines acceptance or rejection thereof and outputs the acknowledge signal ACK to one of the macros 701 to 703 to perform DMA. In other words, the microcomputer 700 inputs and outputs the request signal REQ and the acknowledge signal ACK from and to each of the macros 701 to 703 individually.

However, when the macro is increased in number by 1, the terminal of the microcomputer 700 is increased in number by 2. Therefore, there is only one choice to be made, either abandoning DMA because of the limitation on the number of the terminals of the microcomputer 700 or increasing the terminals in number at a risk of an increase in cost of the microcomputer 700.

SUMMARY OF THE INVENTION

It is an object of the present invention to perform DMA in response to requests from a plurality of macros (request devices) without increasing the number of terminals of a DMAC (microcomputer).

According to an aspect of the present invention, a direct memory access device to which a direct memory access controller and a plurality of request devices are connected, is provided. The direct memory access controller includes: one request signal input terminal for inputting a request signal while at least one of the plurality of request devices is outputting the request signal; one acknowledge signal output terminal for outputting an acknowledge signal to the plurality of request devices; and a control circuit. The control circuit outputs the acknowledge signal from the acknowledge signal output terminal and thereafter controls a data transfer based on the request signal from one of the plurality of request devices in response to a timing when the request signal inputted from the request signal input terminal changes in level.

Both the direct memory access controller and the plurality of request devices can recognize from where a request, made from the plurality of request devices, actually comes, using two signal lines for the request signal and the acknowledge signal. This allows requests for direct memory access to be inputted in multiple channels without increasing the number of terminals of the direct memory access controller, thereby realizing lowered cost and increased functions.

BRIEF DESCRIPTION OF THE DRAWINGS

FIG. 1 is a block diagram showing a configuration of a DMA device operable according to a first and second embodiments of the present invention;

DETAILED DESCRIPTION OF THE PREFERRED EMBODIMENTS

Figure 2:
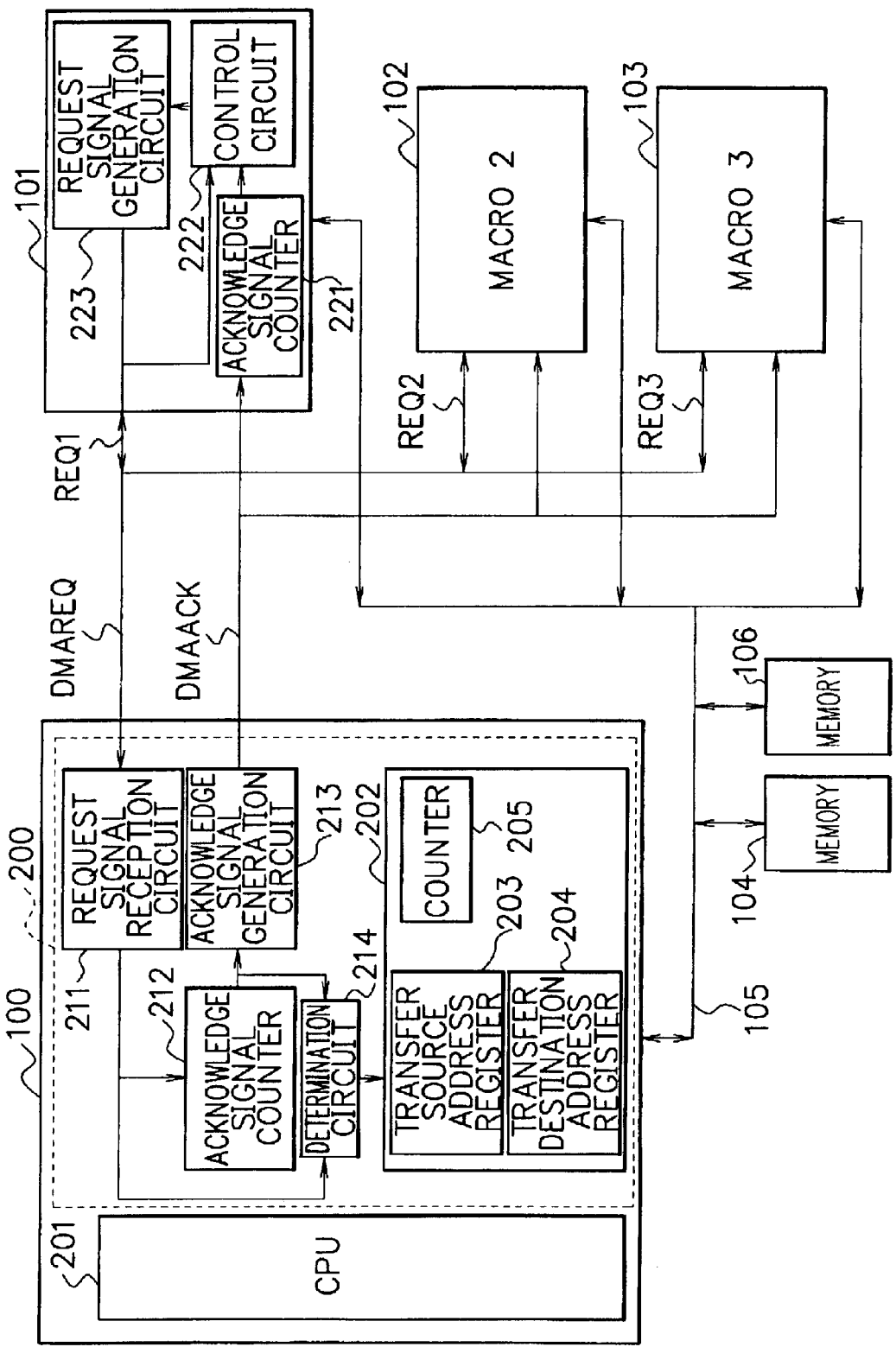
FIG. 2 is a block diagram showing a detailed configuration of the DMA device of FIG. 1.

FIG. 1 shows a configuration of a direct memory access (DMA) device according to an embodiment of the present invention. A microcomputer 100 contains a central processing unit (CPU) and a DMA controller (DMAC) and has one input terminal for a request signal DMAREQ and one output terminal for an acknowledge signal DMAACK. Macros 101 to 103 are request devices and have input/output terminals for themselves outputting request signals REQ1 to REQ3 and inputting the request signal DMAREQ and acknowledge signal input terminals for inputting the acknowledge signal DMAACK, respectively.

The microcomputer 100 is connected to each of the macros 101 to 103 through one request signal DMAREQ line and one acknowledge signal DMAACK line. The request signal DMAREQ line is pulled down and turns to high level while at least one of a plurality of the macros 101 to 103 is outputting any of the request signals REQ1 to REQ3 and turns to low level while none of the macros 101 to 103 is outputting any of the request signals REQ1 to REQ3. The microcomputer 100 outputs the same acknowledge signal DMAACK to the plurality of macros 101 to 103.

The microcomputer 100 and each of the macros 101 to 103 are connected to each other through a bus 105. To the bus 105, memories 104 and 106 are connected in addition. The bus 105 includes a clock line, an address line, a data line, a read/write control line and so on.

The macros 101 to 103 can request the DMAC in the microcomputer 100 to perform DMA by outputting the request signals REQ1 to REQ3. The DMAC in the microcomputer 100 controls DMA between the memories 104 and 106 and DMA between the memory 104 or 106 and input/output devices (I/O devices) in accordance with the request. The input/output devices are input and/or output devices, for example, the macros 101 to 103.

When there are a plurality of macros 101 to 103, requests from the macros 101 to 103 may compete with each other. In this event, the DMAC in the microcomputer 100 selects one macro having a highest priority from among the macros 101 to 103 which have made requests and performs DMA in accordance with the request from the selected one of the macros 101 to 103. A controlling method thereof is explained next.

FIG. 2 shows a detailed configuration of the microcomputer 100 and the macro (request device) 101 in the DMA device in FIG. 1. The macros 102 and 103 have configurations similar to that of the macro 101.

The microcomputer 100 has a CPU 201 and a DMAC 200. The DMAC 200 has a request signal reception circuit 211, an acknowledge signal counter 212, an acknowledge signal generation circuit 213, a determination circuit 214, and an access control circuit 202. The access control circuit 202 has a transfer source address register 203, a transfer destination address register 204, and a counter 205. The macro 101 has an acknowledge signal counter 221, a control circuit 222, and a request signal generation circuit 223.

First Embodiment

Figure 3:
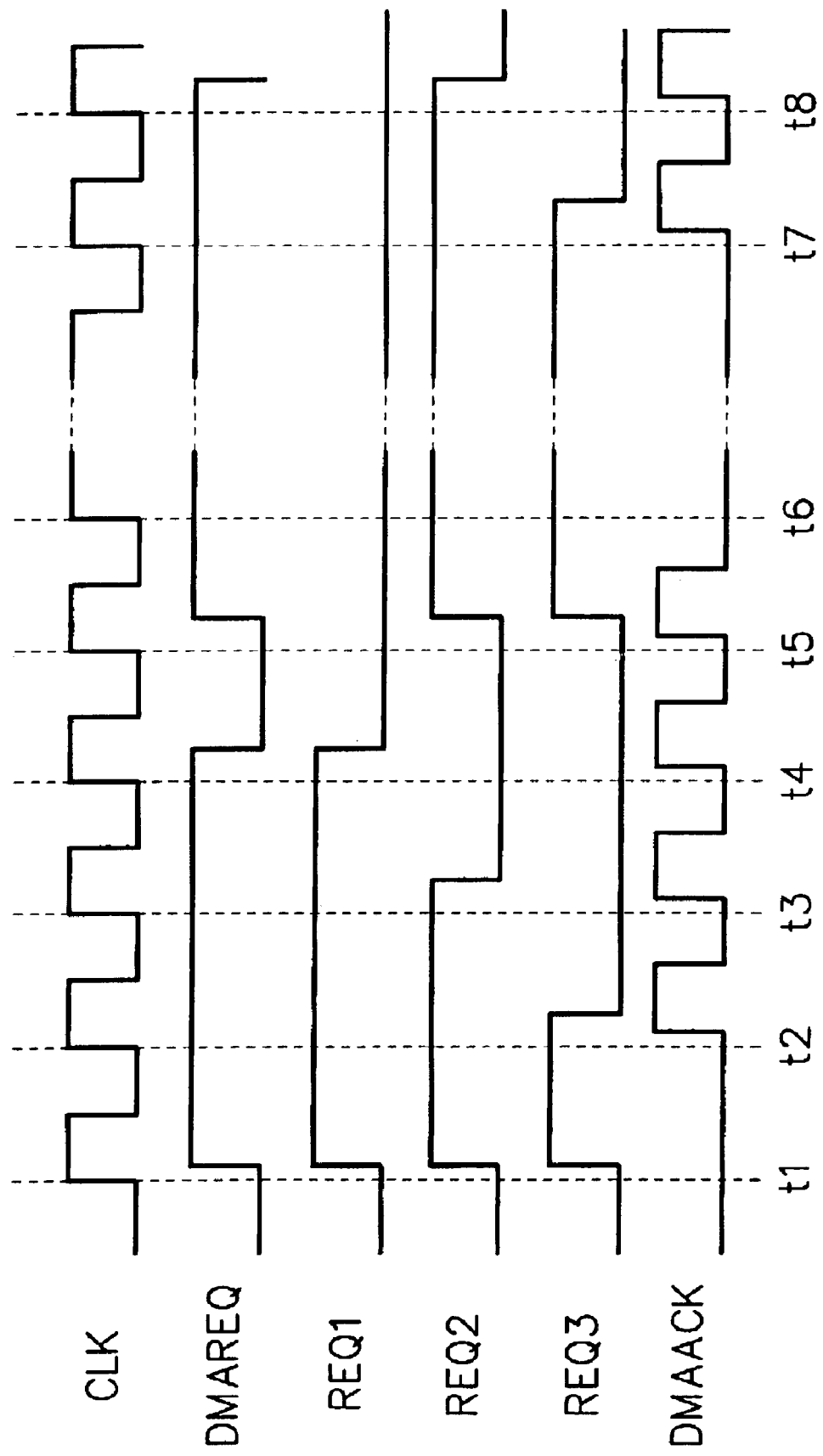
FIG. 3 is a timing chart showing the operation of the DMA device according to a first embodiment.

FIG. 3 is a timing chart showing the operation of the DMA device in FIG. 2. A clock CLK is generated by the CPU 201 and supplied through the bus 105 to the macros 101 to 103. Timings t1 to t8 are timings of rising edges of the clock CLK respectively. It is previously set that, for example, the macro 101 has the first priority, the macro 102 has the second priority, and the macro 103 has the third priority when the requests from the macros 101 to 103 compete with each other.

A case is explained, as an example, in which after a timing t1, the three request signal generation circuits 223 in the macros 101 to 103 bring the request signals REQ1 to REQ3 to high level almost at the same time. The request signal DMAREQ turns to high level when any one of the request signals REQ1 to REQ3 turns to high level, and turns to low level when all of the request signals REQ1 to REQ3 are at low level.

Subsequently, at a timing t2, the request signal reception circuit 211 of the DMAC 200 receives the request signal DMAREQ at high level. In response to this, the acknowledge signal counter 212 initializes the counter value to 1 and outputs the counter value to the acknowledge signal generation circuit 213. The acknowledge signal generation circuit 213 outputs a first pulse of the acknowledge signal DMAACK.

Next, the operation of the macro 103 is explained. The acknowledge signal counter 221 receives the acknowledge signal DMAACK and counts the number of pulses of the acknowledge signal DMAACK to recognize that it is the first pulse. The control circuit 222 recognizes that its own macro 103 is at the third priority being the lowest priority, and controls the request signal generation circuit 223 to bring the request signal REQ3 to low level at the aforesaid first pulse. The request signal generation circuit 223 brings the request signal REQ3 to low level and outputs it. The request signal DMAREQ is kept at high level because the request signals REQ1 and REQ2 are at high level. The control circuit 222 can determine that the request signal DMAREQ is kept at high level to recognize that the request from its own macro 103 has not been accepted.

Meanwhile, the determination circuit 214 of the DMAC 200 can also similarly determine that the request signal DMAREQ is still at high level to recognize that the determination circuit 214 should reject the request from the macro 103. It should be noted that the determination circuit 214 previously recognizes that the macro 103 is at the third priority, and that the determination circuit 214 should determine acceptance or rejection of the request from the macro 103 at the timing after the first pulse.

Subsequently, at a timing t3, the acknowledge signal counter 212 of the DMAC 200 brings the counter value to 2 in response to the clock CLK, and the acknowledge signal generation circuit 213 outputs a second pulse of the acknowledge signal DMAACK.

Next, the operation of the macro 102 is explained. The acknowledge signal counter 221 receives the acknowledge signal DMAACK and recognizes that it is the second pulse. The control circuit 222 recognizes that its own macro 102 is at the second priority, and controls the request signal generation circuit 223 to bring the request signal REQ2 to low level at the aforesaid second pulse. The request signal generation circuit 223 brings the request signal REQ2 to low level and outputs it. The request signal DMAREQ is kept at high level because the request signal REQ1 is at high level. The control circuit 222 can determine that the request signal DMAREQ is kept at high level to recognize that the request from its own macro 102 has not been accepted.

Meanwhile, the determination circuit 214 of the DMAC 200 can also similarly determine that the request signal DMAREQ is still at high level to recognize that the determination circuit 214 should reject the request from the macro 102. It should be noted that the determination circuit 214 previously recognizes that the macro 102 is at the second priority, and that the determination circuit 214 should determine acceptance or rejection of the request from the macro 102 at the timing after the second pulse.

Subsequently, at a timing t4, the acknowledge signal counter 212 of the DMAC 200 brings the counter value to 3 in response to the clock CLK, and the acknowledge signal generation circuit 213 outputs a third pulse of the acknowledge signal DMAACK.

Next, the operation of the macro 101 is explained. The acknowledge signal counter 221 receives the acknowledge signal DMAACK and recognizes that it is the third pulse. The control circuit 222 recognizes that its own macro 101 is at the first priority, and controls the request signal generation circuit 223 to bring the request signal REQ1 to low level at the aforesaid third pulse. The request signal generation circuit 223 brings the request signal REQ1 to low level and outputs it. The request signal DMAREQ changes to low level because all of the request signals REQ1 to REQ3 are at low level. The control circuit 222 can determine that the request signal DMAREQ has changed to low level to recognize that the request from its own macro 101 has been accepted.

Meanwhile, the determination circuit 214 of the DMAC 200 can also similarly determine that the request signal DMAREQ is at low level to recognize that the determination circuit 214 should accept the request from the macro 101. It should be noted that the determination circuit 214 previously recognizes that the macro 101 is at the first priority, and that the determination circuit 214 should determine acceptance or rejection of the request from the macro 101 at the timing after the third pulse.

Subsequently, at a timing t5, the acknowledge signal counter 212 of the DMAC 200 brings the counter value to 4 in response to the clock CLK, and the acknowledge signal generation circuit 213 outputs a fourth pulse of the acknowledge signal DMAACK.

Next, the operations of the macros 102 and 103 are explained. The acknowledge signal counters 221 receive the acknowledge signal DMAACK and recognize that it is the fourth pulse. The control circuits 222 control the request signal generation circuits 223 to bring the request signals REQ2 and REQ3 again to high level because the requests from their own macros 102 and 103 have not been accepted. The request signal generation circuits 223 bring the request signals REQ2 and REQ3 to high level and output them. The request signal DMAREQ thus turns to high level.

Subsequently, at a timing t6, receiving the determination result of the determination circuit 214, the access control circuit 202 performs the following DMA in accordance with the request from the macro 101 whose request has been accepted. A transfer source address, a transfer destination address, and a transfer data size (the number of transfers) are stored in the transfer source address register 203, the transfer destination address register 204, and the counter 205 respectively. The access control circuit 202 controls DMA (data transfer) between the memories or DMA between the memory and the input/output device in accordance with the stored information.

After the completion of DMA, at a timing t7, the DMAC 200 outputs again the first pulse of the acknowledge signal DMAACK. Then, the macro 103 brings the request signal REQ3 to low level.

Subsequently, at a timing t8, the DMAC 200 outputs a second pulse of the acknowledge signal DMAACK. Then, the macro 102 brings the request signal REQ2 to low level. The request signal DMAREQ also turns to low level, so that the request from the macro 102 is accepted. Thereafter, DMA in accordance with the request from the macro 102 is performed.

As described above, when the three macros 101 to 103 are connected, their priorities are previously established, so that the request signals REQ1 to REQ3 are brought to low level in sequence from the macro at the lowest priority in response to the pulses of the acknowledge signal DMAACK. This permits the macro 103 to bring the request signal REQ3 to low level in response to the first pulse of the acknowledge signal DMAACK after the timing t2, and recognize that a macro other than itself is making a request because the request signal DMAREQ is at high level in spite of the request signal REQ3 at low level and that its own request has not been accepted. Similarly, after the timing t3, the macro 102 also recognizes that its own request is not accepted. The last macro 101 recognizes that its own request has been accepted from the fact that the macro 101 has brought the request signal REQ1 to low level after the timing t4, whereby the request signal DMAREQ has turned to low level. Thereafter, at the timing t5, a fourth pulse of the acknowledge signal DMAACK is outputted, and signals REQ2 and REQ3 of the macro 102 and the macro 103, whose requests have not been accepted, are again brought to high level. The series of operations makes it possible to determine from which macro among the three macros 101 to 103 a request is made through the two signal DMAREQ and DMAACK lines and to perform DMA.

Figure 4:
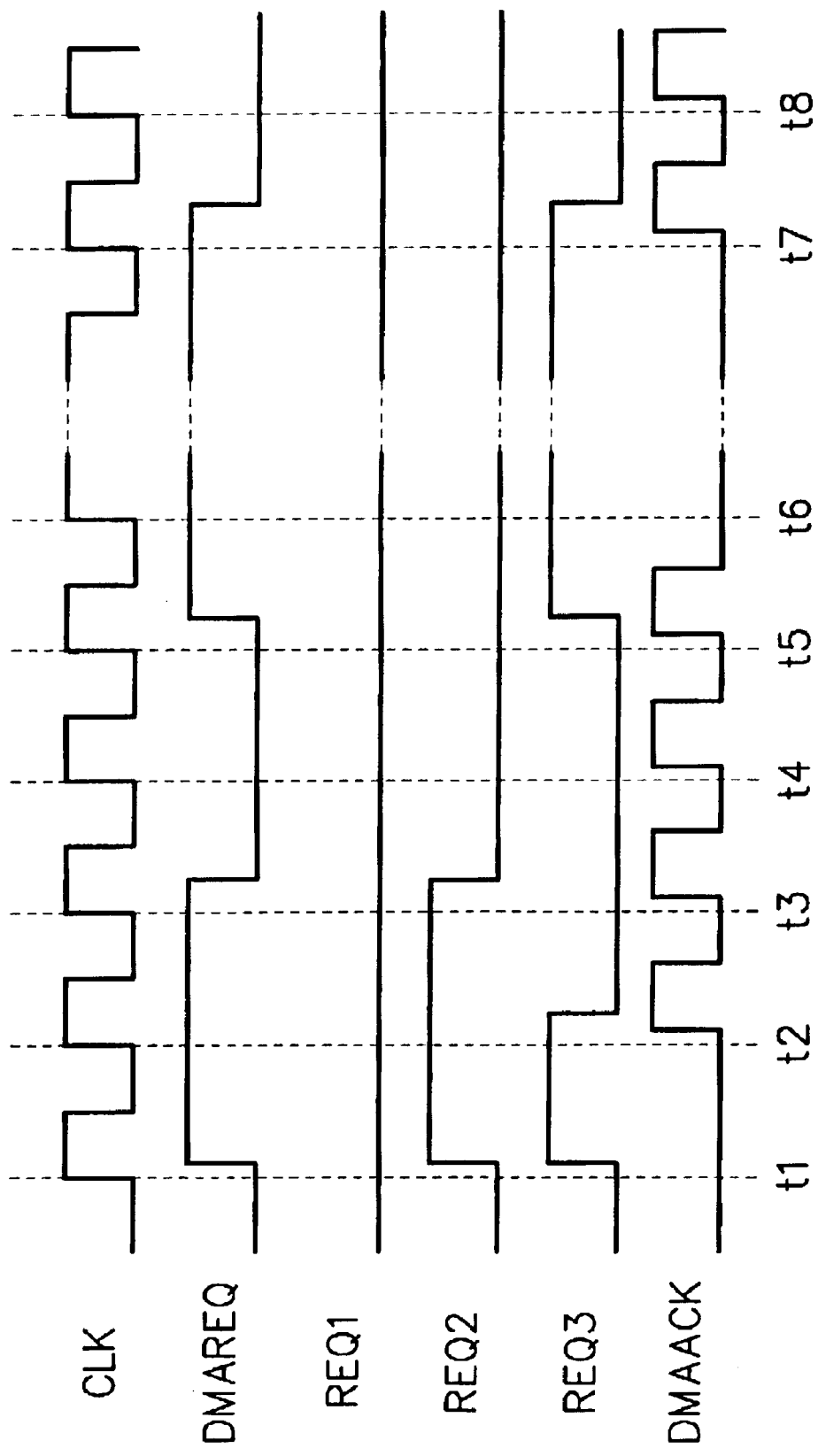
FIG. 4 is another timing chart showing the operation of the DMA device according to the first embodiment.

FIG. 4 is a timing chart when the request signals REQ2 and REQ3 compete with each other.

After, a timing t1, the request signals REQ2 and REQ3 turn to high level and the request signal REQ1 turns to low level. In short, a case is explained in which only the macros 102 and 103 make requests.

Subsequently, after a timing t2, the request signal REQ3 is brought to low level in response to a first pulse of the acknowledge signal DMAACK. In this event, because the request signal DMAREQ is still at high level, the macro 103 recognizes that its request has not been accepted.

Subsequently, after a timing t3, the request signal REQ2 is brought to low level in response to a second pulse of the acknowledge signal DMAACK. In this event, because the request signal DMAREQ changes to low level, the macro 102 recognizes that its request has been accepted.

Subsequently, after a timing t5, the request signal REQ3 of the macro 103, whose request has not been accepted, is brought to high level in response to a fourth pulse of the acknowledge signal DMAACK.

Subsequently, at a timing t6, DMA in accordance with the request from the macro 102 is performed. After a timing t7, the request signal REQ3 is again brought to low level in response to the first pulse of the acknowledge signal DMAACK. In this event, because the request signal DMAREQ changes to low level, the macro 103 recognizes that its request has been accepted. Thereafter, DMA in accordance with the request from the macro 103 is performed.

As described above, the DMAC 200 outputs the acknowledge signal DMAACK from the acknowledge signal output terminal when the request signal DMAREQ is inputted from the request signal input terminal, and thereafter controls a data transfer (DMA) based on one of the request signals REQ1 to REQ3 from one of the plurality of macros 101 to 103 in response to the timing when the input of the request signal DMAREQ is completed. In this event, the DMAC 200, which stores the relationship between the plurality of macros 101 to 103 and the aforesaid input completion timing of the request signal, can determine acceptance or rejection of the request from each of the macros 101 to 103.

Meanwhile, each of the macros 101 to 103 outputs each of the request signals REQ1 to REQ3 from its request signal input/output terminal, then inputs the acknowledge signal DMAACK from its acknowledge signal input terminal, and thereafter completes the output of each of the request signals REQ1 to REQ3 after a lapse of a fixed period which is different for each macro to thereby make a request for direct memory access.

Second Embodiment

Figure 5:
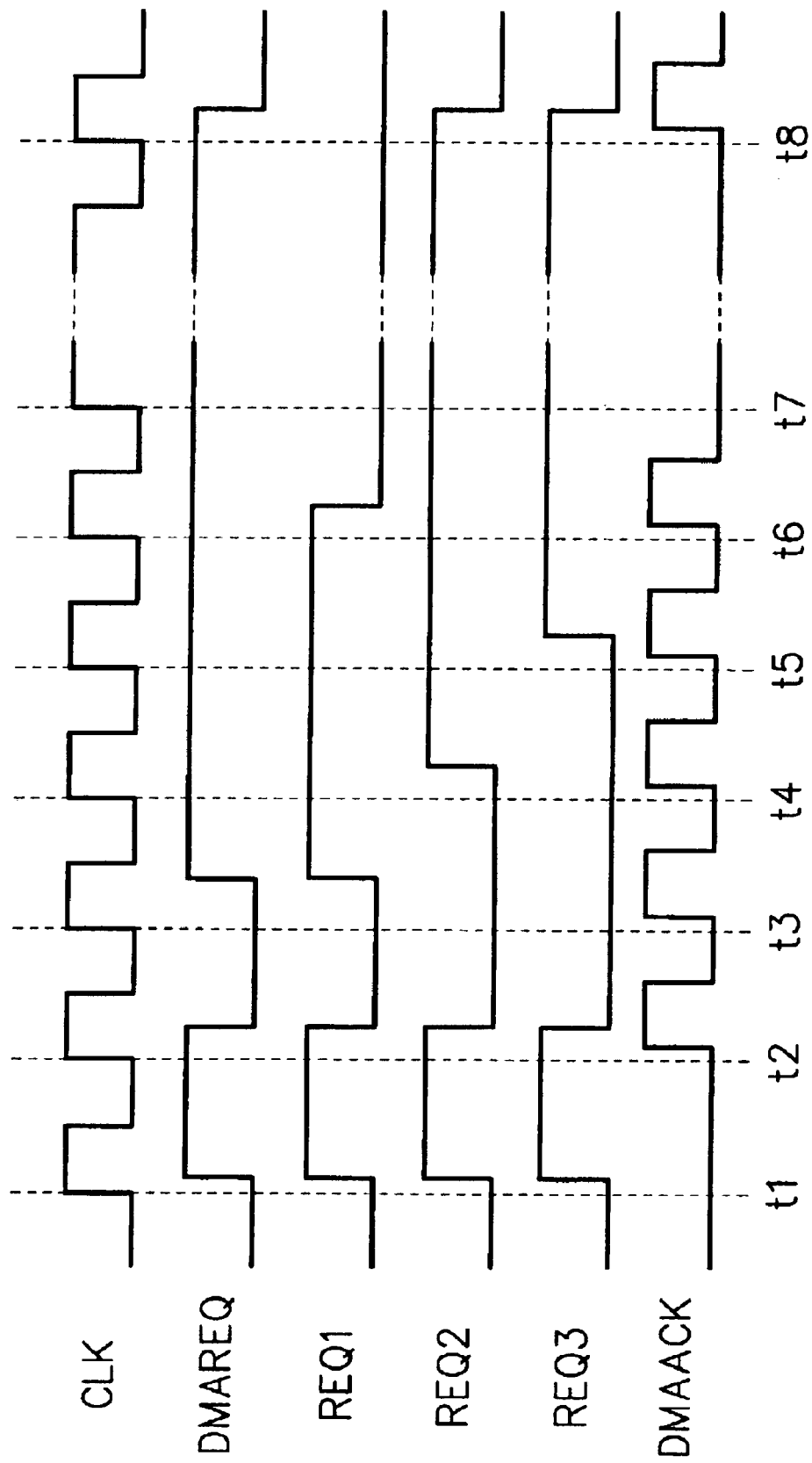
FIG. 5 is a timing chart showing the operation of a DMA device according to a second embodiment of the present invention.

FIG. 5 shows a timing chart of a DMA device according to a second embodiment of the present invention. The DMA device of this embodiment is the same in configuration as those (i.e., the DMA device) in FIG. 1 and FIG. 2, and is different therefrom only in the control method thereof. A case is explained, as an example, in which three request signals REQ1 to REQ3 compete with each other. When three macros 101 to 103 are connected, their priorities are previously established.

After a timing t1, the request signals REQ1 to REQ3 turn to high level. Subsequently, after a timing t2, all of the request signals REQ1 to REQ3 are once brought to low level by a first pulse of an acknowledge signal DMAACK.

Subsequently, at timings t3 to t5, the request signals REQ1 to REQ3 are brought to high level in sequence from the macro having the highest priority in response to second to fourth pulses of the acknowledge signal DMAACK. This permits the macro 101 to bring the request signal REQ1 to high level after the timing t3 in response to the second pulse of the acknowledge signal DMAACK. Since the request signal DMAREQ is at low level at the immediately preceding timing t3, the macro 101 recognizes that its own request has been accepted.

Subsequently, after the timing t4, the macro 102 brings the request signal REQ2 to high level. Since the request signal DMAREQ is at high level at the immediately preceding timing t4, the macro 102 recognizes that its own request has not been accepted.

Subsequently, after the timing t5, the macro 103 similarly brings the request signal REQ3 to high level. Since the request signal DMAREQ is at high level at the immediately preceding timing t5, the macro 103 recognizes that its own request has not been accepted.

Subsequently, after a timing t6, only the macro 101, whose request has been accepted, brings the request signal REQ1 to low level in response to a fifth pulse of the acknowledge signal DMAACK. The request signals REQ2 and REQ3 are kept at high level because their requests have not been accepted.

Subsequently, after a timing t7, DMA is performed in accordance with the request from the macro 101 whose request has been accepted. After a timing t8, the request signals REQ2 and REQ3 are again brought to low level in response to the first pulse of the acknowledge signal DMAACK. Hereafter, the same processing as described above is performed.

Figure 6:
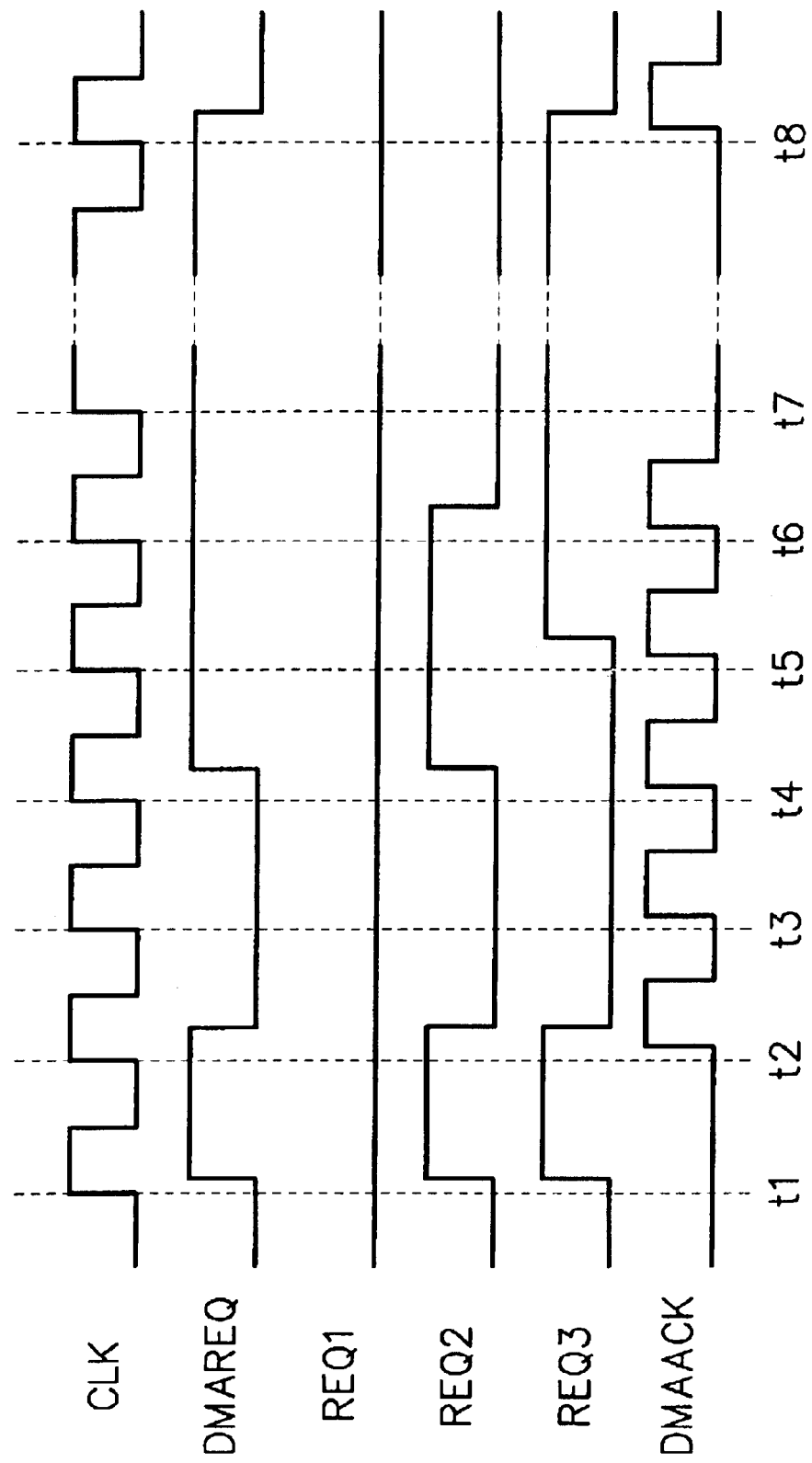
FIG. 6 is another timing chart showing the operation of the DMA device according to the second embodiment.
Figure 7:
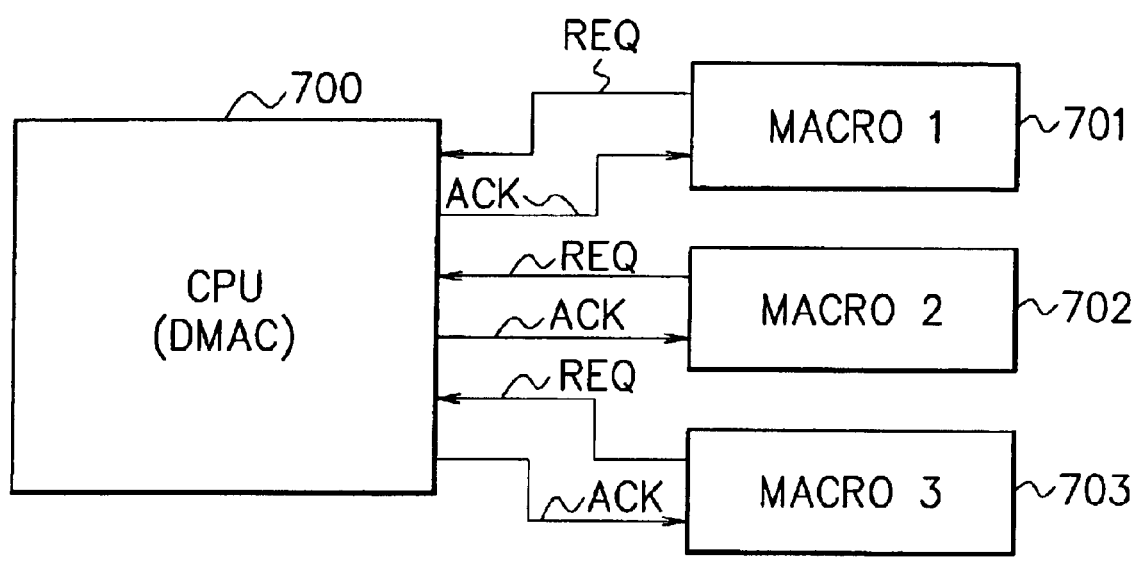
FIG. 7 is a block diagram showing a configuration of a DMA device according to the prior art.

FIG. 6 is a timing chart when the request signals REQ2 and REQ3 compete with each other.

After a timing t1, the request signals REQ2 and REQ3 turn to high level, and the request signal REQ1 turns to low level. In short, a case is explained in which only the macros 102 and 103 make requests. Subsequently, after a timing t2, the request signals REQ2 and REQ3 are brought to low level in response to a first pulse of the acknowledge signal DMAACK.

Subsequently, at timings t3 to t5, the request signals REQ2 and REQ3 are brought to high level in sequence from the macro having a higher priority in response to second to fourth pulses of the acknowledge signal DMAACK. This permits the macro 102 to bring the request signal REQ2 to high level after the timing t4 in response to the third pulse of the acknowledge signal DMAACK. Since the request signal DMAREQ is at low level at the immediately preceding timing t4, the macro 102 recognizes that its own request has been accepted.

Subsequently, after the timing t5, the macro 103 brings the request signal REQ3 to high level. Since the request signal DMAREQ is at high level at the immediately preceding timing t5, the macro 103 recognizes that its own request has not been accepted.

Subsequently, after a timing t6, only the macro 102, whose request has been accepted, causes the request signal REQ2 to fall in response to a fifth pulse of the acknowledge signal DMAACK. The request signal REQ3 is kept at high level because its request has not been accepted.

Subsequently, after a timing t7, DMA is performed in accordance with the request from the macro 102 whose request has been accepted. After a timing t8, the request signal REQ3 is again brought to low level in response to the first pulse of the acknowledge signal DMAACK. Hereafter, the same processing as described above is performed.

As described above, the DMAC 200 outputs the acknowledge signal DMAACK from the acknowledge signal output terminal when the request signal DMAREQ is inputted from the request signal input terminal, and thereafter controls a data transfer (DMA) based on the request signal from one of the plurality of macros 101 to 103 in response to the timing when the input of the request signal DMAREQ is completed and thereafter the input of the request signal DMAREQ is again started. In this event, the DMAC 200, which stores the relationship between the plurality of macros 101 to 103 and the aforesaid input start timing of the request signal DMAREQ, can determine acceptance or rejection of the request from each of the macros 101 to 103.

Meanwhile, each of the macros 101 to 103 is designed to output each of the request signals REQ1 to REQ3 from its request signal input/output terminal and then inputs the acknowledge signal DMAACK from its acknowledge signal input terminal, and thereafter completes the output of each of the request signals REQ1 to REQ3 and then starts the output of each of the request signals REQ1 to REQ3 after a lapse of a fixed period which is different for each macro to thereby make a request for direct memory access.

The DMAC 200 determines acceptance or rejection of the requests from the macros 101 to 103 at the timing when the request signal DMAREQ turns to low level in the first embodiment, and determines acceptance or rejection of the requests from the macros 101 to 103 at the timing when the request signal DMAREQ turns to high level in the second embodiment. In short, the DMAC 200 can determine acceptance or rejection of the requests from the macros 101 to 103 based on the timing when the request signal DMAREQ changes in level.

In the first and second embodiments, the request signal DMAREQ (REQ1 to REQ3) is manipulated using the two signal lines for the request signal DMAREQ and the acknowledge signal DMAACK in accordance with the number of the pulses of the acknowledge signal DMAACK, thereby enabling both the DMAC (master) 200 and the macros (slaves) 101 to 103 to recognize from where a request, made from the macros 101 to 103 being the plurality of DMA request sources, actually comes. This allows DMA requests to be inputted in multiple channels without increasing the number of terminals of the package of the microcomputer 100 containing the DMAC 200, thereby realizing lowered cost and increased functions.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

As has been described, both the direct memory access controller and the plurality of request devices can recognize from where a request, made from the plurality of request devices, actually comes, using the two signal lines for the request signal and the acknowledge signal. This allows requests for direct memory access to be inputted in multiple channels without increasing the number of terminals of the direct memory access controller, thereby realizing lowered cost and increased functions.

What is claimed is:

1. A direct memory access controller, comprising:
   one request signal input terminal inputting data transfer request signals from a plurality of request devices;
   one acknowledge signal output terminal outputting an acknowledge signal to said plurality of request devices; and a control circuit controlling a data transfer based on the request signal from one of said plurality of request devices in response to the request signal inputted from said request signal input terminal, wherein said control circuit outputs the acknowledge signal from said acknowledge signal output terminal, and thereafter controls a data transfer based on the request signal from one of said plurality of request devices in response to a timing when the request signal inputted from said request signal input terminal changes in level.

2. The direct memory access controller according to claim 1, wherein said control circuit controls a data transfer between memories.

3. The direct memory access controller according to claim 1, wherein said control circuit controls a data transfer between an input and/or output device and a memory.

4. The direct memory access controller according to claim 1, wherein said control circuit outputs the acknowledge signal from said acknowledge signal output terminal when the request signal is inputted from said request signal input terminal, and thereafter controls a data transfer based on the request signal from one of said plurality of request devices in response to a timing when the input of the request signal is completed.

5. The direct memory access controller according to claim 4, wherein said control circuit stores a relationship between said plurality of request devices and the input completion timing of the request signal.

6. The direct memory access controller according to claim 5, wherein said control circuit outputs the acknowledge signal in pulse form from said acknowledge signal output terminal.

7. The direct memory access controller according to claim 1, wherein said control circuit outputs the acknowledge signal from said acknowledge signal output terminal when the request signal is inputted from said request signal input terminal, and thereafter controls a data transfer based on the request signal from one of said plurality of request devices in response to a timing when the input of the request signal is completed and then input of the request signal is again started.

8. The direct memory access controller according to claim 7, wherein said control circuit stores a relationship between said plurality of request devices and the input start timing of the request signal.

9. The direct memory access controller according to claim 8, wherein said control circuit outputs the acknowledge signal in pulse form from said acknowledge signal output terminal.

10. A direct memory access device to which a direct memory access controller and a plurality of request devices are connected, wherein said direct memory access controller comprises:

one request signal input terminal inputting a request signal while at least one of said plurality of request devices is outputting the request signal;

one acknowledge signal output terminal outputting an acknowledge signal to said plurality of request devices; and a control circuit outputting the acknowledge signal from said acknowledge signal output terminal, and thereafter controlling a data transfer based on the request signal from one of said plurality of request devices in response to a timing when the request signal inputted from said request signal input terminal changes in level, wherein each of said request devices comprises a request signal input/output terminal outputting the request signal and inputting the request signal while at least one of said plurality of request devices is outputting the request signal, an acknowledge signal input terminal inputting the acknowledge signal outputted from said direct memory access controller, and a control circuit inputting the acknowledge signal from said acknowledge signal input terminal, and thereafter changing a level of the request signal outputted to said request signal input/output terminal after a lapse of a fixed period which is different for each of said request devices to make a request for a data transfer.

11. The direct memory access device according to claim 10, wherein said control circuit of said direct memory access controller outputs the acknowledge signal from said acknowledge signal output terminal when the request signal is inputted from said request signal input terminal, and thereafter controls a data transfer based on the request signal from one of said plurality of request devices in response to a timing when the input of the request signal is completed.

12. The direct memory access device according to claim 10, wherein said control circuit of said direct memory access controller outputs the acknowledge signal from said acknowledge signal output terminal when the request signal is inputted from said request signal input terminal, and thereafter controls a data transfer based on the request signal from one of said plurality of request devices in response to a timing when the input of the request signal is completed and then input of the request signal is again started.

13. A request device, comprising:

a request signal input/output terminal outputting a request signal and inputting the request signal on a request signal line;

an acknowledge signal input terminal inputting an acknowledge signal; and a control circuit inputting the acknowledge signal from said acknowledge signal input terminal, and thereafter changing a level of the request signal to be outputted to said request signal input/output terminal after a lapse of a fixed period to make a request for direct memory access.

14. The request device according to claim 13, wherein said control circuit outputs the request signal from said request signal input/output terminal, thereafter inputs the acknowledge signal from said acknowledge signal input terminal, and then completes the output of the request signal after a lapse of a fixed period to make a request for direct memory access.

15. The request device according to claim 14, wherein said control circuit determines acceptance or rejection of the request in accordance with whether or not said request signal line changes in level at a timing of completion of the output of the request signal.

16. The request device according to claim 13, wherein said control circuit outputs the request signal from said request signal input/output terminal, thereafter inputs the acknowledge signal from said acknowledge signal input terminal, and then completes the output of the request signal and starts output of the request signal after a lapse of a fixed period to thereby-make a request for direct memory access.

17. The request device according to claim 16, wherein said control circuit determines acceptance or rejection of the request in accordance with whether or not said request signal line changes in level at a timing of the start of the output of the request signal.

* * * * *

UNITED STATES PATENT AND TRADEMARK OFFICE
CERTIFICATE OF CORRECTION

PATENT NO. : 6,868,457 B2
DATED : March 15, 2005
INVENTOR(S) : Satoshi Matsui

It is certified that error appears in the above-identified patent and that said Letters Patent is hereby corrected as shown below:

<u>Column 11,</u>
Line 7, delete "thereby-".

Signed and Sealed this

Fourth Day of October , 2005

JON W. DUDAS
*Director of the United States Patent and Trademark Office*